(No Model.)

H. BEISHEIM.
VALVE FOR STEAM PUMPS.

No. 451,591. Patented May 5, 1891.

WITNESSES:
Gilbert S. Dey
Fred F. Church

INVENTOR,
Henry Beisheim
BY
Church & Church
His ATTORNEYS

THE NORRIS PETERS CO., PHOTO-LITHO., WASHINGTON, D. C.

UNITED STATES PATENT OFFICE.

HENRY BEISHEIM, OF ROCHESTER, NEW YORK.

VALVE FOR STEAM-PUMPS.

SPECIFICATION forming part of Letters Patent No. 451,591, dated May 5, 1891.

Application filed February 10, 1891. Serial No. 380,872. (No model.)

*To all whom it may concern:*

Be it known that I, HENRY BEISHEIM, of Rochester, in the county of Monroe and State of New York, have invented certain new and useful Improvements in Valves for Steam-Pumps; and I do hereby declare the following to be a full, clear, and exact description of the same, reference being had to the accompanying drawings, forming a part of this specification, and to the figures of reference marked thereon.

My present invention relates to improvements in valves for steam-pumps or direct-acting engines, and has for its objects to provide a valve motion that will be simple and cheap in construction and certain in operation, and, further, a valve that will permit the operation of the engine or pump by a small amount of steam and at a very slow rate, if desired, so that a perfect and steady pressure or vacuum may be maintained if used on a force or vacuum pump, and this without liability of becoming inoperative by leakage or other causes.

To these and other ends the invention consists in certain novelties of construction and combinations of parts, all as will be hereinafter fully described, and the novel features pointed out in the claims at the end of this specification.

Figure 1:
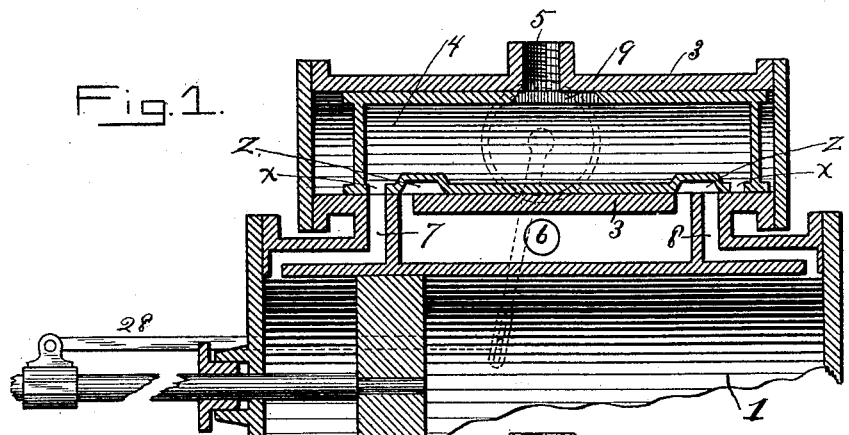
Figure 2:
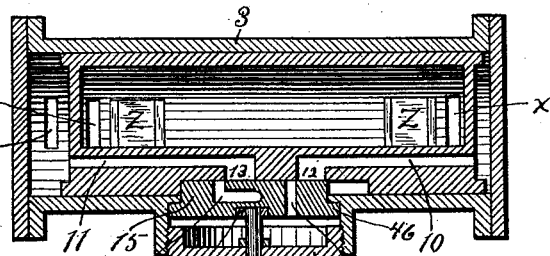
Figure 3:
Figure 4:
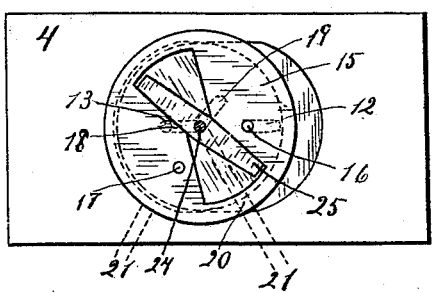
Figure 5:
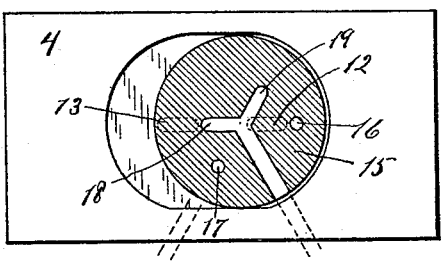

In the drawings, Figure 1 is a longitudinal sectional view of a steam-engine valve and cylinder embodying my improvements; Fig. 2, a cross-section on the line $x\,x$ of Fig. 1; Fig. 3, a horizontal section on the line $y\,y$ of Fig. 2; Figs. 4 and 5, diagrammatic views showing the operation of the main and auxiliary valves.

Similar figures of reference in the several figures indicate similar parts.

1 indicates the main steam-cylinder; 2, the piston operating therein; 3, the casing in which the main valve 4 operates; 5, the steam-inlet pipe, and 6 the general exhaust-passage; 7 and 8, the ports leading from the valve to the steam-cylinders and controlled, as usual, by the ports $x\,x$ and $z\,z$ in the main valve. The main valve 4 is preferably cylindrical and hollow, as shown, with a central aperture 9, communicating all the time with the main steam-inlet, having abutments or heads, and steam-passages 10 11 formed therein on one side, extending from the ends to near the center, where they terminate in ports 12 and 13, arranged in a flattened part or side of said valve, as shown in Figs. 2 and 3.

An aperture preferably circular in form is formed in the side of the casing 3 for the accommodation of the circular auxiliary valve 15, having a flange 46 bearing on a suitable surface on the casing, as shown, while its inner flat portion has a bearing on the flat face of the main valve. This auxiliary valve has in its inner face four ports, two of which 16 and 17 are inlet-ports and extend clear through the valve, and two exhaust-ports 18 and 19, communicating with a channel 20 inside the valve, which latter is adapted when in proper position to connect with one of the two exhaust-ports 21 21, arranged in the valve-casing and communicating with the exhaust-chamber 6. The chamber containing the auxiliary valve is closed by a circular covering-plate 22, having a stuffing-box 23 therein, through which passes a stem or rod 24, having in its inner end laterally-extending arms 25 inserted in a recess in the valve, said arms being reduced near their ends, as shown, so that the stem may be permitted to turn some distance before actuating the valve, as will be understood. Steam is admitted to the chamber on the outer side of the auxiliary valve from the supply-pipe by a small passage-way 26, and the valve is held firmly to its seat by pressure.

To the end of the stem 24 is secured an arm 27, having a slot at its lower end through which a bolt is passed connected by a link 28 with a cross-head attached to the piston-rod, as usual in this class of devices, the connection and relation of the ports being such that said arm will move with the piston, but by reason of the play allowed the arms 25 in the auxiliary valve the latter will not be actuated until the piston reaches the end of its stroke.

The relation existing between the ports of the auxiliary valve and the co-operating ones in the main valve is such that when the port 12, we will say, is connected with the direct port 16 in the auxiliary valve, as in Fig. 4, and the exhaust-port 18 is connected with the other port 13, the main valve is moved by the steam to the left, and just before it reaches the end of its stroke the port 12 passes from under port 16 and the steam is cut off, the exhaust being cut off at the same time, the ports being then in the position shown in Fig. 5. At this time the arm 27 is actuated by the main piston and the auxiliary valve reversed, the port 17 then occupying the position in which port 16 is indicated in Fig. 4, and the other ports corresponding relatively when the same operations will take place, the valve, however, moving in the reverse direction and cutting off as before.

It will be noted that the feature of cutting off the steam from the heads of the main valve and the exhaust as well, prevents the valve from striking the cylinder-head, the small amount of steam on the exhaust side forming a cushion, and also that by arranging the inlet-ports 16 and 17 farther from the center of rotation of the auxiliary valve than the exhaust-ports the reversal of the auxiliary will insure the proper registering of the ports in it and the main valve to cause the reversal of the operation of the main valve. As the throttle-valve controlling the supply of steam to the pump or engine is above the pump, it will be seen that even if a very small opening is left the steam will gradually accumulate in the auxiliary valve-chamber in sufficient quantity to operate the main valve positively and cut off the steam as soon as the auxiliary valve is positively operated, when the main portion of the steam is available to actuate the main piston, which latter will of course move very gradually if the throttle is only open a short distance.

I have found by practical operation that a pump provided with this mechanism will make only one stroke every ten minutes or operate at the rate of sixty per minute, depending upon the steam-supply and to some extent upon the load also.

By the use of the tubular main valve with the flattened portion on the outside and locating the auxiliary valve against it I am enabled to greatly cheapen and facilitate the construction and assembling of the ports, and also access to them may be readily had, if necessary or desirable, by the removal of the cap-plate.

It will of course be understood that the exhaust-ports in the auxiliary valve could be located farther from the center of oscillation than the direct ports and the same operations had as with the present construction, and also that separate valve-ports in different planes could be provided in the main valve and the auxiliary valve provided with the ports the same distance from the center. I prefer the present arrangement for the reason that the inlet-ports, being farther from the center, do not require the nice adjustment they would if closer.

I claim as my invention—

1. The combination, with the valve-casing and the main valve having the ports in the side communicating with the outer ends of the valve-chamber, of the rotary oscillatory auxiliary valve having the direct and the exhaust ports therein supported in the valve-casing and co-operating with ports in the main valve, substantially as described.

2. The combination, with the valve-casing and the main valve having the ports in the side communicating with the outer ends of the valve-chamber, of the rotary oscillatory auxiliary valve having the two inlet and two exhaust ports, said ports being located at different distances from the center of oscillation, whereby the main valve operates as a cut-off, substantially as described.

3. The combination, with the valve-casing and the main valve having the ports in the side communicating with the outer ends of the valve-chamber, of the rotary oscillatory auxiliary valve having the ports co-operating with those in the main valve, the recess in its outer side, the stem having the arms cooperating in said recess, the cover-plate through which said stem passes, having the stuffing-box and the actuating-arm connected to the stem, substantially as described.

4. The combination, with the valve-casing, the tubular valve having the heads at the ends, the flattened side, the ports $x$ and $z$, passages 10 and 11, and ports 12 and 13, of the rotary oscillatory auxiliary valve having the inlet and exhaust ports and bearing against the side of the main valve, and actuating devices for said valve, substantially as described.

5. The combination, with the main-valve casing having the circular aperture in its side, the valve operating therein having the flat side, and the ports, of the rotary oscillatory auxiliary valve having the ports seated on the casing and valve and actuating devices for said valve, substantially as described.

6. The combination, with the valve-chamber, the main hollow piston-valve having the ports and passages 10 and 11 and 12 and 13 and the heads, and ports $x$ and $z$, of the steam-chamber at the side of the main-valve chamber, and the rotary oscillatory valve located therein, having the ports co-operating with those in the side of the main valve, substantially as described.

HENRY BEISHEIM.

Witnesses:
 FRED F. CHURCH,
 WILLIAM B. HALE.